US 11,445,013 B2

(12) United States Patent
Bai et al.

(10) Patent No.: US 11,445,013 B2
(45) Date of Patent: Sep. 13, 2022

(54) METHOD FOR CHANGING MEMBER IN DISTRIBUTED SYSTEM AND DISTRIBUTED SYSTEM

(71) Applicant: Huawei Technologies Co., Ltd., Shenzhen (CN)

(72) Inventors: Yang Bai, Shenzhen (CN); Lei Chen, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 103 days.

(21) Appl. No.: 17/125,318

(22) Filed: Dec. 17, 2020

(65) Prior Publication Data
US 2021/0136145 A1 May 6, 2021

Related U.S. Application Data

(63) Continuation of application No. PCT/CN2019/076844, filed on Mar. 4, 2019.

(30) Foreign Application Priority Data

Jun. 30, 2018 (CN) .......................... 201810703094.7

(51) Int. Cl.
G06F 15/16 (2006.01)
H04L 67/104 (2022.01)
(Continued)

(52) U.S. Cl.
CPC ...... *H04L 67/1046* (2013.01); *H04L 41/0886* (2013.01); *H04L 41/0889* (2013.01); *H04L 67/34* (2013.01); *H04L 67/5682* (2022.05)

(58) Field of Classification Search
CPC ............. H04L 67/1046; H04L 41/0886; H04L 67/5682; H04L 67/34
(Continued)

(56) References Cited

U.S. PATENT DOCUMENTS

2003/0145063 A1* 7/2003 Asai .................... H04L 61/4552
709/217
2012/0184209 A1* 7/2012 Wengrovitz ............ H04L 67/12
709/224
2013/0232118 A1 9/2013 Reid et al.

FOREIGN PATENT DOCUMENTS

CN 101877858 B 9/2012
CN 102984267 A 3/2013
(Continued)

OTHER PUBLICATIONS

Ban, B., "A Simple Clustered Task Distribution System," Oct. 6, 2008,XP002803249, 16 pages.
(Continued)

*Primary Examiner* — Lan Dai T Truong
(74) *Attorney, Agent, or Firm* — Conley Rose, P.C.

(57) ABSTRACT

A method for changing a member in a distributed system, includes requesting, by a first target node, a node address set from a management server, where the node address set includes first addresses of all nodes in the distributed system, sending, by the first target node, a join request to a master node in the distributed system when the node address set does not comprise a second address of the first target node, adding, by the master node, the second address to the node address set, and instructing all slave nodes in the distributed system to add the second address to a corresponding local member list.

20 Claims, 3 Drawing Sheets

(51) Int. Cl.
*H04L 41/08* (2022.01)
*H04L 67/00* (2022.01)
*H04L 67/5682* (2022.01)

(58) Field of Classification Search
USPC ........................................ 709/204, 223, 224
See application file for complete search history.

(56) References Cited

FOREIGN PATENT DOCUMENTS

| | | | |
|---|---|---|---|
| CN | 105656653 | A | 6/2016 |
| CN | 106712981 | A | 5/2017 |
| CN | 106911728 | A | 6/2017 |
| CN | 107222520 | A | 9/2017 |

OTHER PUBLICATIONS

Dorejavaguru, "How Zookeeper Works?," Apr. 30, 2016, XP002803250, 4 pages.

\* cited by examiner

METHOD FOR CHANGING MEMBER IN DISTRIBUTED SYSTEM AND DISTRIBUTED SYSTEM

CROSS-REFERENCE TO RELATED APPLICATIONS

This application is a continuation of International Patent Application No. PCT/CN2019/076844 filed on Mar. 4, 2019, which claims priority to Chinese Patent Application No. 201810703094.7 filed on Jun. 30, 2018. The disclosures of the aforementioned applications are hereby incorporated by reference in their entireties.

TECHNICAL FIELD

This application relates to the computer field, and in particular, to a distributed system.

BACKGROUND

A distributed system includes a plurality of members. After a member is added to (or removed from) the distributed system, member addition (or removal) information needs to be notified to each member such that a member in a cluster can learn a latest member status in the cluster. For example, a member can add a new member to a member list recorded by the member (or delete an existing member from a member list recorded by the member).

In the industry, a member is changed mainly through a log synchronization technology. After the member is added (or removed), a master node of the cluster obtains member addition (or removal) information, and synchronizes a member change instruction to each slave node in a form of an operation log. After receiving the member change instruction, the slave node updates, based on the operation log, a member list recorded by the slave node.

In an existing technology, it is assumed that a cluster member set before the member change is C1, and a cluster member set after the member change is C2. The following describes two phases of performing the member change. Phase 1: The master node notifies all original members to update, by executing the log, the cluster member set to {C1, C2} (that is, the members in the cluster have saved C1 and C2). At this time, a member list of each original member is C1 (no update notification is received or an update is not completed) or {C1, C2} (an update notification is received and an update is completed). For the {C1, C2} list, the master node must be accepted by most members in the set C1 and the set C2. That is, the master node needs to meet a rule, where a master node accepted by members holding the list C1 is the same as a master node accepted by members holding the list C2. This ensures that there is no scenario having two master nodes during the member change. Phase 2: After the first phase is successful (most members or all members have successfully updated to {C1, C2}), the master node notifies all the members to update the member set to C2 through the execution log. Before the update is completed, the member list of each member is {C1, C2} (before the update is completed) or C2 (after the update is completed).

As can be learned from the above, the foregoing solution of using the log is too complex, and is time-consuming and node resource-intensive. Manual intervention is required, increasing a workload of operations and maintenance (O&M) personnel.

SUMMARY

According to a first aspect, a method for changing a member in a distributed system is provided, including requesting, by a first target node, a node address set from a management server, where the node address set includes: addresses of all nodes in the distributed system, and a master node and a plurality of slave nodes in the distributed system, when an address of the first target node is not in the node address set, sending, by the first target node, a join request to the master node in the distributed system, where the join request includes the address of the first target node, and after receiving the join request, adding the address of the first target node in the member addition instruction to a local member list of the master node, and indicating, by the master node, each node in the distributed system to add the address of the first target node to a local member list. According to the method, the first target node can actively and spontaneously join the distributed system, and O&M personnel no longer need to manually configure the master node. Logs are no longer used as a technical means. A whole process is simple and efficient, and resource usage is low.

In a first possible implementation of the first aspect, the first target node creates a local member list of the first target node, where the local member list of the first target node includes the addresses of all the nodes in the distributed system, and the address of the first target node. This solution is used to configure the first target node such that the first target node accepts that the first target node is a member of the distributed system.

In a second possible implementation of the first aspect, that the master node indicates each slave node in the plurality of slave nodes in the distributed system to add the address of the first target node to the local member list includes sending, by the master node, the member addition instruction to each slave node, where the member addition instruction includes the address of the first target node, receiving, by the master node, a member addition response sent by the slave node, where the member addition response is a response message in response to the member addition instruction, and adding, by the master node, the address of the first target node to the local member list, and sending, by the master node, a member addition effective instruction to all the slave nodes, to indicate all the slave nodes to add, after receiving the member addition effective instruction, the address of the first target node to the local member list based on the member addition response. This solution describes a direct interaction process between the master node and the slave nodes when a slave node is added.

In a third possible implementation of the first aspect, sending, by the first target node, a join request to the master node includes sending, by the first target node, the join request to the master node by broadcasting the join request to all the addresses in the node address set. The broadcast method can ensure that the join request can be sent to the master node, to avoid that the master node cannot receive the join request.

In a fourth possible implementation of the first aspect, after sending, by the first target node, a join request to the master (including requesting, by a first target node, a node address set from a management server), the method further includes one of the following steps: caching, by the master node, a received next join request, or caching, by the master node, a received exit request. This solution can avoid a conflict caused by parallel processing of a plurality of member change requests, and avoid loss of other join/exit requests.

In a fifth possible implementation of the first aspect, the member addition effective instruction includes a commit instruction. This solution describes a specific content of the member addition effective instruction.

In a sixth possible implementation of the first aspect, the address includes at least one or more combinations of a node identifier (ID), a node Internet Protocol (IP) address, and a node port number. This solution describes a possible form of the address. The address may alternatively be in another form, and may be used as a unique identifier of a node.

In a seventh possible implementation of the first aspect, after the master node receives another join request, the master node records a member change tag, where the member change tag includes a change type and an address of a third target node. Before the master node processes the other join request, and the master node indicates each slave node in the plurality of slave node in the distributed system to add the address of the first target node to the local member list, the master node is faulty, the slave nodes in the distributed system elect a new master node. After reading the change tag, the new master node indicates, based on the change type, the slave node in the distributed system to add the address of the third target node to the local member list. In this solution, after the master node is faulty, the newly selected master node may perform a member addition/deletion operation again. This ensures reliable execution of the member addition/deletion request.

In an eighth possible implementation of the first aspect, based on the second possible implementation of the first aspect, the method may further include sending, by a second target node, an exit request to the master node, after receiving the exit request, sending, by the master node, a member deletion instruction to all the slave nodes, where the member exit instruction includes an address of the second target node, after receiving the member deletion instruction, sending, by each slave node, a member deletion response to the master node, and after receiving the member deletion response from the slave node, deleting, by the master node, the address of the second target node from the node address set, deleting, by the master node, the address of the second target node from the local member list, and sending, by the master node, a member deletion effective instruction to each slave node, and deleting, by each slave node, the address of the second target node from the local member list. This solution describes how to delete a node from the distributed system.

According to a second aspect, a node set is provided. The node set includes a first target node and a distributed system. The distributed system includes a plurality of nodes, and the distributed system may perform the method in the first aspect or any one of the possible implementations of the first aspect.

According to a third aspect, a method for changing a member in a distributed system is provided, including requesting, by a second target node, a node address set from a management server, where the distributed system includes a master node and a plurality of slave nodes, and the node address set includes addresses of all nodes in the distributed system, when an address of the second target node is in the node address set, sending, by the second target node, an exit request to the master node in the distributed system, where the exit request includes the address of the second target node, and after receiving the exit request from the second target node, deleting, by the master node, the address of the second target node from a local member list of the master node, and indicating each slave node in the plurality of slave nodes in the distributed system to delete the address of the second target node from a local member list. A deletion process can be initiated by a node that needs to be deleted. O&M personnel do not need to manually configure the master node. In addition, the deletion process does not use logs. This is simple and efficient, and reduces system resource usage.

In a first possible implementation of the third aspect, indicating, by the master node, all slave nodes in the distributed system to delete the address of the second target node from a local member list includes sending, by the master node, a member deletion instruction to all the slave nodes in the distributed system, where the member addition instruction includes the address of the second target node, sending, by the slave nodes that receives the member deletion instruction, a member deletion response to the master node, after determining that the member deletion responses of all the slave nodes are received, deleting, by the master node, the address of the second target node from the node address set of the management server, and sending a member deletion effective instruction to all the slave nodes, and deleting, by the slave nodes, the address of the second target node from the local member list after receiving the member addition effective instruction. This solution describes a specific deletion process, for example, the specific operations on the slave nodes and the master node.

According to a fourth aspect, a distributed system is provided. The distributed system includes a plurality of nodes, and the distributed system may perform the method in the third aspect or any one of the possible implementations of the third aspect.

DESCRIPTION OF EMBODIMENTS

A distributed system (or a cluster) includes a plurality of nodes, and the nodes each have a computing capability, for example, the node is a computer or a server. Alternatively, the node is a controller of a storage array. Nodes that form the distributed system are also referred to as members of the distributed system. Based on functions of the nodes, the nodes in the distributed system can be classified into a master node and a slave node. The master node has a specific management function for the slave node.

Figure 1:
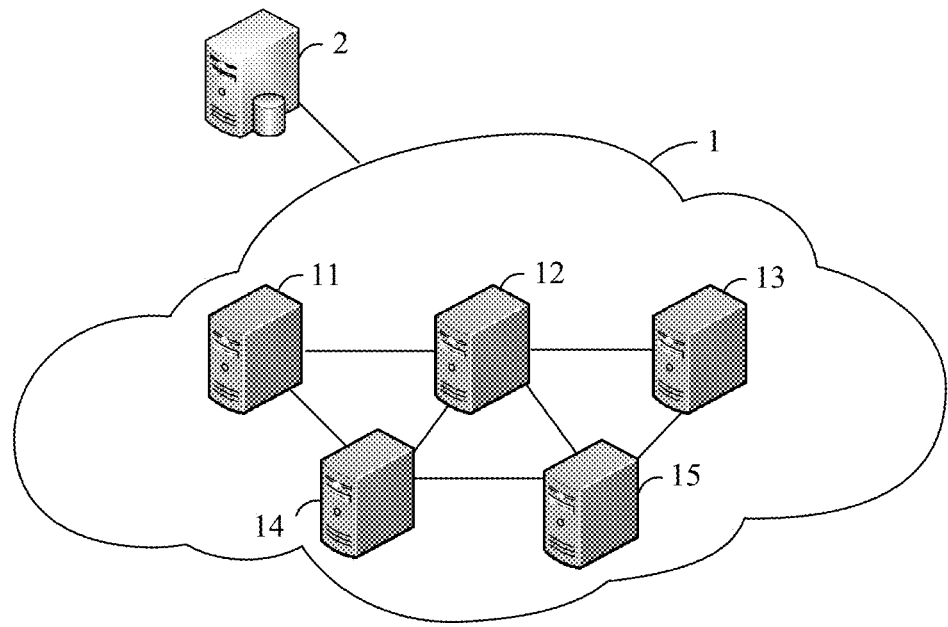
FIG. 1 is a topology diagram of an embodiment of a distributed system according to the present disclosure.

Referring to FIG. 1, a distributed system 1 includes a node 11, a node 12, a node 13, a node 14, and a node 15. The node 11 is a master node, and other nodes are slave nodes. A distributed system 2 communicates with a management server 2.

The distributed system 1 in this embodiment of the present disclosure may be a self-selected master distributed system. For example, a Paxos algorithm-based distributed system, a Zookeeper Atomic Broadcast (ZAB) algorithm-based distributed system, or a Raft algorithm-based distributed system. The self-selected master refers to that, after the master node 11 is faulty, a new master node may be selected from the slave nodes, which are nodes inside the distributed system (that is, the slave node 12, the slave node 13, and the slave node 14) rather than a node outside the distributed system.

Figure 2:
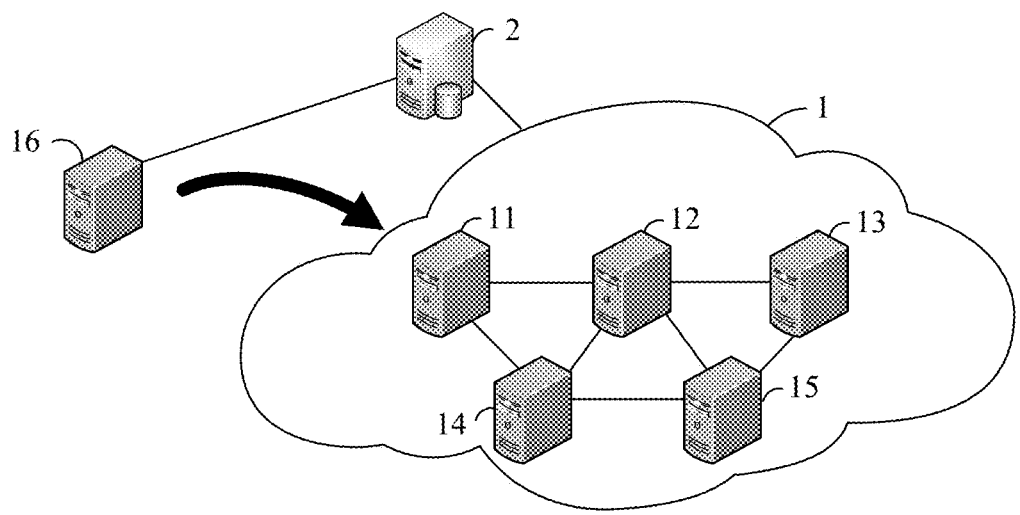
FIG. 2 is a schematic diagram of adding a new member to an existing distributed system.
Figure 3:
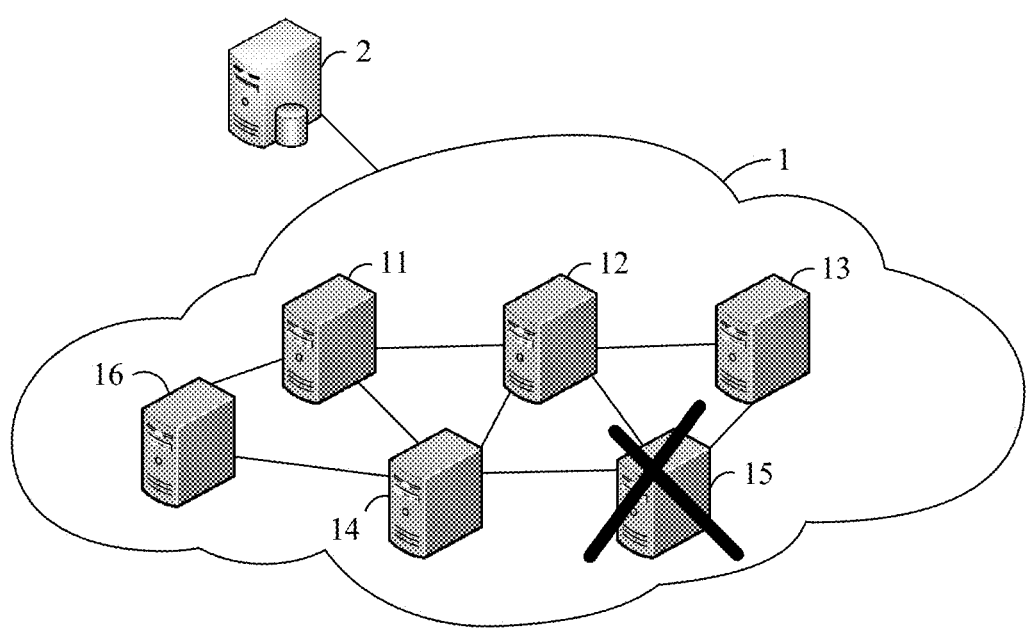
FIG. 3 is a schematic diagram of deleting an existing member from an existing distributed system.

Because the distributed system has a plurality of (sometimes even a large quantity of) members, there is a problem of making nodes to go online and offline. For example, if a total quantity of members in the distributed system is insufficient to meet service requirements, a new member needs to be added to the distributed system. That is, a new member needs to go online. If reliability of a node decreases or a node is faulty, or a total quantity of nodes is far greater than a required quantity, the quantity of nodes in the distributed system needs to be reduced. That is, an existing member needs to go offline. Adding or reducing the quantity of members in the distributed system is collectively referred to as changing a member in the distributed system. Referring to FIG. 2, a node 16 is a node outside the distributed system 1, and needs to be added to the distributed system 1. The node 15 and the entire distributed system 1 may be considered as a node set. Referring to FIG. 3, the node 15 is a node outside the distributed system 1, and needs to be deleted from the distributed system 1.

Generally, a two-phase log method is too complex and must be manually triggered by an administrator on a master node. This consumes a large quantity of resources of the distributed system and increases a workload of the administrator.

Figure 4:
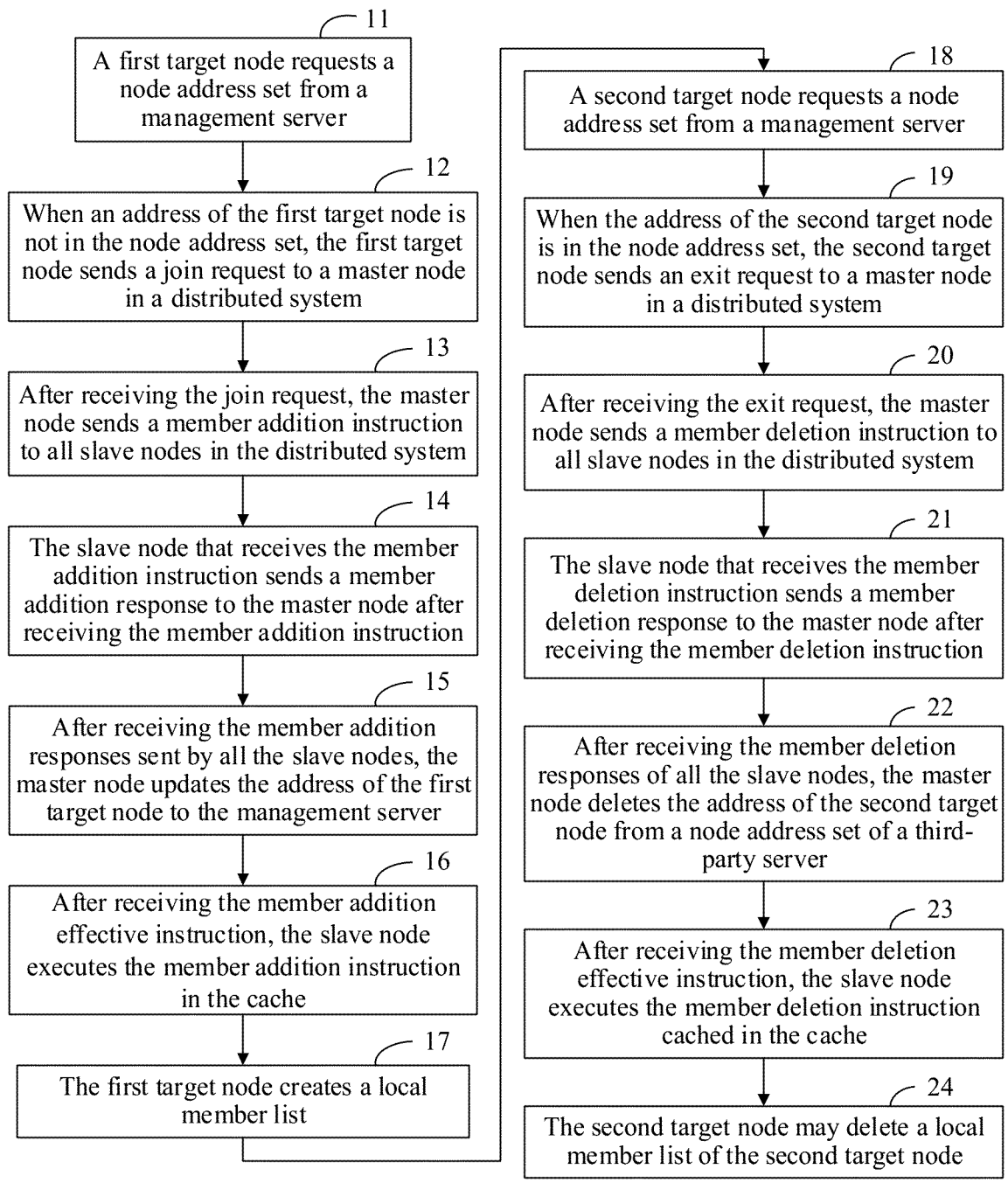
FIG. 4 is a flowchart of a method for changing a member in a distributed system.

As shown in FIG. 4, an embodiment of the present disclosure provides a method for changing a member in a distributed system.

Step 11: A first target node (for example, the node 16 in FIG. 2) requests a node address set from a management server (a management server 2), where the node address set includes addresses of all nodes in the distributed system.

The first target node is a node that needs to be added to the distributed system. In this step, an administrator does not need to intervene, and the first target node actively requests the node address set from the management server.

The management server may be outside the distributed system, or may be a node that has a storage function in the distributed system, provided that the management server has a non-volatile storage function. For example, the management server may also be the first target node.

The node address set includes the addresses of all the nodes in the distributed system. The node addresses are used to distinguish different nodes, and may be considered as labels of the nodes. For example, the node address is one or a combination of a node ID and a node IP address, or may be a combination of a node ID, a node IP address, and a node port number.

Step 12: After obtaining the address set, the first target node determines whether an address of the first target node is in the address set, to determine whether the first target node is an existing node in the distributed system.

When the address of the first target node is in the node address set, it indicates that the first target node has joined the distributed system, and the process exits.

When the address of the first target node is not in the node address set, the first target node sends a join request to a master node in the distributed system. The join request includes the address of the first target node.

It should be noted that the first target node may send the join request to the master node in a plurality of manners. The following provides an example.

When the first target node cannot learn an address of the master node, it is difficult to establish a point-to-point communication connection to the master node. In this case, the first target node may send the join request to the master node using the node address set to broadcast to all the nodes in the distributed system. In another solution, the first target node sends the join request to one or more nodes in the distributed system, and if a node that receives the join request is not the master node, continues to transfer the join request until the master node receives the join request.

When the first target node may obtain the address of the master node (for example, the address of the master node is pre-stored in a server, and the first target node may obtain the address of the master node from the server), the first target node may directly send the join request to the master node after obtaining the address of the master node.

Step 13: After receiving the join request, the master node sends a member addition instruction to all slave nodes in the distributed system, to add the first target node to the distributed system. The member addition instruction includes the address of the first target node.

Each node (including the master node and a member node) in the distributed system has a member list. The member list is used to record all members (or record all members except the node) in the distributed system, and recorded specific information may be member addresses.

The master node may send the member addition instruction to all the members through the member addresses in the member list.

Step 14: The slave node that receives the member addition instruction sends a member addition response to the master node after receiving the member addition instruction. The member addition response is a response message in response to the member addition instruction, and is used to notify the master node that the slave node has successfully received the member addition instruction. A member addition operation is not performed in this step (that is, the first target node is not "added" at this time), and the member is added in step 16. The slave node that receives the member addition instruction may cache the member addition instruction, and send the member addition response after successfully caching the member addition instruction.

Step 15: After receiving the member addition responses sent by all the slave nodes, the master node adds the address of the first target node to the member list of the master node based on the address of the first target node included in the member addition instruction.

In addition, after determining that the member addition responses sent by all the slave nodes are received, the master node may further send a member addition effective instruction to the slave nodes, where the instruction is used to indicate the slave nodes to execute the member addition instruction cached in the step 14. Further, the member addition effective instruction may be a commit instruction.

In addition, the master node may further send the address of the first target node to the management server such that the management server writes the address of the first target node into the node address set. The address of the first target node is added to the node address set of the management server. That is, the node address set is updated. After the node address set is updated, if a node in a new phase needs to subsequently join or exit a distributed cluster, the node may determine whether the node is in the distributed cluster by querying an updated member address set.

Step 16: After receiving the member addition effective instruction, the slave node executes an addition operation of the first target node (for example, executes the member addition instruction in the cache), that is, adds the address of the first target node to a local member list of the slave node.

For a node in the distributed system, adding the address of the first target node to the local member list indicates acknowledging that the first target node is a member in the distributed system.

It should be noted that "local" in the embodiments of the present disclosure is for a node. For example, a node named a node A is used as an example. A local member list of the node A belongs to the node A. A processor of the node A may learn, by reading a member list of the node A, the node A and other members in a distributed system in which the node A is located. The member list may be stored on the node A, but in some cases may also be stored outside the node A.

Step 17: The first target node creates a local member list, where the local member list created by the first target node includes addresses of all original nodes in the distributed system. Optionally, the local member list may further include the address of the first target node.

After the steps 15, 16, and 17 are completed, the first target node creates the local member list of the first target node, and all nodes including the original nodes in the distributed system update the local member lists of all the nodes such that the first target node is added to the distributed system. It can be learned from the foregoing steps that, the solution in this embodiment of the present disclosure provides a node addition technology of "automatic member discovery". A new node may be actively added to a distributed storage system, and the original distributed system may sense the addition of the new node. This simplifies intervention of O&M personnel in the member change and makes an entire member change process more automatic and intelligent.

The following describes a process of deleting a second target node from the distributed system in steps 18 to 23. There may be a plurality of reasons for deleting the second target node, for example, reliability of the second node is reduced, there are too many resources in the distributed system, and the second target node needs to be replaced. The second target node may be any node (for example, the node 15 in FIG. 3) in the distributed system other than the master node. For example, the second target node may be the first target node (the node 16). When the second target node is not the first target node, the process of deleting the node may be performed before (or after) a node addition process. That is, the process of the steps 11 to 17 and the process of the steps 18 to 23 are relatively independent. The two processes may be performed successively or only one of the two processes is performed. The two processes are not performed in parallel.

Step 18: A second target node requests a node address set from a management server, where the node address set includes addresses of all nodes in the distributed system.

The second target node is a node that needs to go offline in the distributed system. In this step, an administrator does not need to intervene, and the second target node actively requests the node address set from the management server.

Step 19: After obtaining the address set, the second target node determines whether an address of the second target node is in the address set. The step is optional.

When the address of the second target node is not in the node address set, it indicates that the second target node does not belong to the distributed system, and the process exits.

When the address of the second target node is in the node address set, the second target node sends an exit request to a master node in the distributed system. The exit request includes the address of the second target node. It should be noted that, in another embodiment, the second target node may send the exit request to the master node in the distributed system without performing the determining step in the step 19. In the other embodiment, determining is optional, and the second target node may directly send the exit request to the master node.

It should be noted that the second target node may send the exit request to the master node in a plurality of manners, for example, unicast, multicast, or broadcast, provided that the exit request can be sent to the master node.

Step 20: After receiving the exit request, the master node sends a member deletion instruction to all slave nodes in the distributed system, to exit the second target node from the distributed system. The member deletion instruction includes the address of the second target node.

The master node may send the member deletion instruction to all members through member addresses in a member list.

Step 21: The slave node that receives the member deletion instruction sends a member deletion response to the master node after receiving the member deletion instruction, to notify the master node that the slave node has successfully received the member deletion instruction. The member deletion response is a response message in response to the member deletion instruction, and is used to notify the master node that the slave node has successfully received the member deletion instruction. In this step, the member deletion instruction may be cached in a memory of the slave node. A deletion operation is not performed in this step (that is, the second target member is not "deleted" in this time), and the second target member is deleted in step 23.

The slave node that receives the member deletion instruction may cache the member deletion instruction, and send the member deletion instruction after successfully caching the member deletion instruction.

Step 22: After receiving the member deletion responses of all the slave nodes, the master node sends a member deletion effective instruction to all the slave nodes.

In addition, the master node further deletes the address of the second target node from the member list of the master node.

The master node may further indicate the management server to delete the address of the second target node from the node address set of the management server. After the node address set is updated, if a node in a new phase needs to subsequently join or exit a distributed cluster, the node may determine whether the node is in the distributed cluster by querying an updated member address set.

The member deletion effective instruction may be a commit instruction, and the master node sends the member deletion effective instruction to indicate the slave node to execute the member deletion instruction cached in the step 14.

Step 23: After receiving the member deletion effective instruction, the slave node executes the deletion operation of the second target node (for example, executes the member deletion instruction cached in the cache), that is, deletes the address of the second target node from a local member list of each slave node.

For a node in the distributed system, deleting the address of the second target node from the local member list indicates that the second target node exits the distributed system and is no longer a member in the distributed system.

After the steps 22 and 23 are performed, the second target node is no longer the member in the distributed system.

Step 24: Optionally, the second target node may delete a local member list of the second target node.

It can be learned from the steps 18 to 24 that, the solution in this embodiment of the present disclosure provides a node deletion technology in which a member "actively deletes the member itself". A node in the distributed system may actively exclude the node from the distributed storage system. In addition, the distributed system may sense a deletion request of the node and respond to the deletion request. This simplifies intervention of O&M personnel in the member change and makes an entire member change process more automatic and intelligent.

Optionally, after the master node receives the join request and before the master node sends the member addition effective instruction to all the member nodes, or after the master node receives the exit request and before the master node sends the member deletion effective instruction to all the member nodes, the master node may perform caching if the master node receives a new join request or a new exit request. This prevents two-member change requests from being executed at the same time.

Optionally, after the master node receives a join request and before the master node sends the member addition effective instruction to all the member nodes, or after the master node receives an exit request and before the master node sends the member deletion effective instruction to all the member nodes, the master node may set a member change tag on the management server. The member change tag is used to record a change type (addition or deletion) and an address of a node that needs to be changed. If the master node is faulty in the foregoing process, a newly selected master node may execute the member change again based on the change type and the address of the node that needs to be changed that are recorded by the member change tag. That is, after the master node receives the join request or the deletion request, the master node records the member change tag. The member change tag includes a change type (an addition type or a deletion type) and an address of the member that needs to be added (for example, an address of a third target node). Before indicating all slave nodes in the distributed system to add the address of the third target node to local member lists, the master node is faulty. The distributed system selects a new master node. After reading the change tag, the new master node adds the address of the first target node to the node address set again, and indicates all the slave nodes in the distributed system to add the address of the third target node to the local member lists. After the master node is faulty, the new master node may be selected based on negotiation between the slave nodes. For example, a slave node with a minimum load is selected as the new master node, or a slave node that joins the cluster earliest is selected as the new master node.

According to the foregoing principle, for example, when any one of the steps 13 to 17 is performed, and after the master node is faulty, based on information recorded by the member change tag, the new master node may perform the member change again from the step 13 (send the member addition instruction to all the slave nodes in the distributed system), to perform the steps 13 to 17 again such that the first target node is added to the distributed system. Similarly, in a process of performing the steps 18 to 23, if the master node is faulty, based on the member change tag, the new master node may perform the step 18 again (send the member addition instruction to all the slave nodes in the distributed system), to perform the steps 18 to 23 again.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for changing a member in a distributed system comprising:
    requesting, by a first target node, a node address set from a management server, wherein the node address set comprises first addresses of all nodes in the distributed system, and wherein the distributed system comprises a master node and a slave node;
    sending, by the first target node, a first join request to the master node when the node address set does not comprise a second address of the first target node, wherein the first join request comprises the second address;
    receiving, by the master node, the first join request;
    adding, by the master node, the second address to a first local member list of the master node; and
    instructing, by the master node, the slave node to add the second address to a second local member list of the slave node.

2. The method of claim 1, further comprising creating, by the first target node, a third local member list of the first target node, wherein the third local member list comprises the first addresses and the second address.

3. The method of claim 1, further comprising:
    sending, by the master node, a member addition instruction to the slave node, wherein the member addition instruction comprises the second address;
    receiving, by the master node in response to the member addition instruction, a member addition response from the slave node;
    adding, by the master node, the second address to the first local member list; and
    sending, by the master node, a member addition effective instruction to the slave node to instruct the slave node to add, after receiving the member addition effective instruction, the second address to the second local member list based on the member addition response.

4. The method of claim 3, wherein the member addition effective instruction comprises a commit instruction.

5. The method of claim 3, wherein after receiving the member addition response, the method further comprises instructing, by the master node, the management server to add the second address to the node address set.

6. The method of claim 1, further comprising sending, by the first target node, the first join request to the master node by broadcasting the first join request to the first addresses.

7. The method of claim 1, wherein after requesting the node address set, the method further comprises caching, by the master node, subsequently received second join requests.

8. The method of claim 1, wherein after requesting the node address set, the method further comprises caching, by the master node, a received exit request.

9. The method of claim 1, wherein each of the first addresses and the second address comprises at least one of a corresponding node identifier (ID), a corresponding node Internet Protocol (IP) address, or a corresponding node port number.

10. The method of claim 1, further comprising:
    sending, by a second target node, an exit request to the master node;
    receiving, by the master node, the exit request;
    sending, by the master node, a member deletion instruction to the slave node, wherein the member deletion instruction comprises a third address of the second target node;
    receiving, by the slave node, the member deletion instruction;

sending, by the slave node, a member deletion response to the master node;

receiving, by the master node, the member deletion response from the slave node;

deleting, by the master node, the third address from the node address set and the first local member list;

sending, by the master node, a member deletion effective instruction to the slave node; and deleting, by the slave node, the third address from the second local member list.

11. The method of claim 1, wherein the distributed system further comprises a plurality of slave nodes, and wherein the method further comprises:

receiving, by the master node, a third join request;

recording, by the master node, a member change tag comprising a change type and a fourth address of a third target node;

determining, by the master node, that the master node is faulty before processing the third join request and instructing to each of the slave nodes to add the second address to a corresponding second local member list;

electing, by the slave nodes, a new master node;

reading, by the new master node, the change tag; and instructing, by the new master node based on the change type, each of the slave nodes to add the fourth address to the corresponding second local member list.

12. A node set comprising:

a distributed system comprising:
  a master node comprising a first local member list; and
  a slave node comprising a second local member list; and a first target node comprising a second address and configured to:
  request a node address set from a management server, wherein the node address set comprises first addresses of all nodes in the distributed system;
  send a first join request to the master node when the node address set does not comprise the second address, wherein the master node is configured to:
  receive the first join request;
  add the second address to the first local member list; and
  instruct the slave node to add the second address to the second local member list.

13. The node set of claim 12, wherein the first target node is further configured to create a third local member list of the first target node, and wherein the third local member list comprises the first addresses and the second address.

14. The node set of claim 12, wherein the master node is further configured to:

send a member addition instruction to the slave node, wherein the member addition instruction comprises the second address;

receive, from the slave node, a member addition response in response to the member addition instruction; and send a member addition effective instruction to the slave node to instruct the slave node to add, after receiving the member addition effective instruction, the second address in the member addition instruction to the second local member list.

15. The node set of claim 12, wherein each of the first addresses and the second address comprises at least one of a corresponding node identifier (ID), a corresponding node Internet Protocol (IP) address, or a corresponding node port number.

16. A method for changing a member in a distributed system comprising:

requesting, by a target node, a node address set from a management server, wherein the node address set comprises first addresses of all nodes in the distributed system, and wherein the distributed system comprises a master node and a slave node;

sending, by the target node, an exit request to the master node when a second address of the target node is in the node address set, wherein the exit request comprises the second address;

receiving, by the master node, the exit request from the target node;

deleting, by the master node, the second address from a first local member list of the master node; and instructing the slave node to delete the second address from a second local member list of the slave node.

17. The method of claim 16, further comprising:

sending, by the master node, a member deletion instruction to the slave node, wherein the member deletion instruction comprises the second address;

receiving, by the master node, a member deletion response from the slave node in response to the member deletion instruction;

deleting, by the master node, the second address from the first local member list; and sending a member deletion effective instruction to the slave node to instruct the slave node to delete the second address from the second local member list by executing the member deletion instruction.

18. The method of claim 16, wherein each of the first addresses and the second address comprises at least one of a corresponding node identifier (ID), a corresponding node Internet Protocol (IP) address, or a corresponding node port number.

19. A distributed system comprising:

a master node comprising a first local member list; and a plurality of slave nodes coupled to the master node and comprising a target node, wherein the target node has a second address, and wherein the target node is configured to:
  request a node address set from a management server, wherein the node address set comprises first addresses of all nodes in the distributed system;
  send an exit request to the master node when the node address set comprises the second address, wherein the exit request comprises the second address, wherein the master node is configured to:
  receive the exit request;
  delete the second address from the first local member list; and
  instruct each of the slave nodes to delete the second address from a corresponding second local member list.

20. The distributed system of claim 19, wherein the master node is further configured to:

send a member deletion instruction to all the slave nodes, wherein the member deletion instruction comprises the second address;

receive member deletion responses from the slave nodes in response to the member deletion instruction;

delete the second address from the first local member list; and send a member deletion effective instruction to all the slave nodes to instruct the slave nodes to delete the second address from the corresponding second local member list by executing the member deletion instruction.

\* \* \* \* \*

UNITED STATES PATENT AND TRADEMARK OFFICE
CERTIFICATE OF CORRECTION

PATENT NO. : 11,445,013 B2
APPLICATION NO. : 17/125318
DATED : September 13, 2022
INVENTOR(S) : Yang Bai and Lei Chen It is certified that error appears in the above-identified patent and that said Letters Patent is hereby corrected as shown below:

On the Title Page

Page 2, item (56) References Cited, Other Publications: "Dorejavaguru, "How Zookeeper" should read "Corejavaguru, "How Zookeeper"

Signed and Sealed this
Twenty-second Day of November, 2022

Katherine Kelly Vidal
Director of the United States Patent and Trademark Office